(12) United States Patent
Honda et al.

(10) Patent No.: US 8,255,672 B2
(45) Date of Patent: Aug. 28, 2012

(54) SINGLE INSTRUCTION DECODE CIRCUIT FOR DECODING INSTRUCTION FROM MEMORY AND INSTRUCTIONS FROM AN INSTRUCTION GENERATION CIRCUIT

(75) Inventors: Iwao Honda, Gunma-ken (JP); Shinya Kishida, Gunma-ken (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 736 days.

(21) Appl. No.: 12/128,325

(22) Filed: May 28, 2008

(65) Prior Publication Data

US 2008/0301401 A1    Dec. 4, 2008

(30) Foreign Application Priority Data

May 30, 2007   (JP) ................. 2007-143517

(51) Int. Cl.
*G06F 7/38* (2006.01)
*G06F 9/00* (2006.01)
*G06F 9/44* (2006.01)
*G06F 9/46* (2006.01)

(52) U.S. Cl. .......... 712/225; 712/228; 718/108

(58) Field of Classification Search ........... 712/225, 712/228
See application file for complete search history.

(56) References Cited

U.S. PATENT DOCUMENTS

| | | | | |
|---|---|---|---|---|
| 4,339,796 A | * | 7/1982 | Brereton et al. | 712/228 |
| 4,493,027 A | * | 1/1985 | Katz et al. | 712/228 |
| 4,764,869 A | * | 8/1988 | Miyazaki et al. | 712/228 |
| 5,142,635 A | * | 8/1992 | Saini | 712/225 |
| 5,390,307 A | * | 2/1995 | Yoshida | 712/225 |
| 5,418,916 A | * | 5/1995 | Hall et al. | 712/228 |
| 5,682,531 A | * | 10/1997 | Nakamura | 718/108 |
| 5,870,596 A | * | 2/1999 | Yoshida | 712/225 |
| 2002/0129229 A1 | * | 9/2002 | Cornaby et al. | 712/245 |

FOREIGN PATENT DOCUMENTS

| | | |
|---|---|---|
| JP | 02-204832 | 8/1990 |
| JP | 04-000533 | 1/1992 |
| JP | 04-260929 | 9/1992 |
| JP | 05-020072 | 1/1993 |
| JP | 05-061901 | 3/1993 |
| JP | 08-505965 | 6/1996 |
| JP | 2001-306319 | 11/2001 |
| JP | 2003-345456 | 12/2003 |
| WO | WO 94/11816 | 5/1994 |

OTHER PUBLICATIONS

Japan Patent Office, Notification of Reasons for Rejection for Application No. 2007-143517, Mail Date Apr. 19, 2011.

* cited by examiner

*Primary Examiner* — Eddie P Chan
*Assistant Examiner* — William B Partridge
(74) *Attorney, Agent, or Firm* — SoCal IP Law Group LLP; Steven C. Sereboff; John E. Gunther

(57) ABSTRACT

A processor includes: a plurality of registers; an instruction readout circuit configured to read out an instruction from a memory; an instruction generation circuit configured to generate instructions for saving data into a predetermined storage area, for the respective registers, if the instruction read out by the instruction readout circuit is an instruction causing the data stored in each of the plurality of registers to be saved; and an instruction execution circuit configured to execute the instruction read out from the memory and the instructions generated by the instruction generation circuit.

8 Claims, 14 Drawing Sheets

| push_exe | pop_exe | push_strt | pop_strt | cnt_reg | reg_id |
|---|---|---|---|---|---|
| 1 | X | X | X | cnt_reg + 1 | cnt_reg |
| 0 | 1 | X | X | cnt_reg − 1 | cnt_reg |
| 0 | 0 | 1 | X | push_sid + 2 | push_sid + 1 |
| 0 | 0 | 0 | 1 | pop_sid − 2 | pop_sid − 1 |
| 0 | 0 | 0 | 0 | cnt_reg | cnt_reg |

| push_exe | pop_exe | push_strt | pop_strt | gen_reg | inst_code |
|---|---|---|---|---|---|
| 1 | X | X | X | gen_reg | push + reg_id + gen_reg |
| 0 | 1 | X | X | gen_reg | pop + reg_id + gen_reg |
| 0 | 0 | 1 | X | stk_id | push + reg_id + stk_id |
| 0 | 0 | 0 | 1 | stk_id | pop + reg_id + stk_id |
| 0 | 0 | 0 | 0 | gen_reg | push + reg_id + gen_reg |

| push_exe | pop_exe | cmp1 | cmp2 | gen_end |
|---|---|---|---|---|
| 0 | 0 | X | X | 0 |
| 1 | 0 | X | 0 | 0 |
| 1 | 0 | X | 1 | 1 |
| 0 | 1 | 0 | X | 0 |
| 0 | 1 | 1 | X | 1 |
| 1 | 1 | 0 | 0 | 0 |
| 1 | 1 | X | 1 | 1 |
| 1 | 1 | 1 | X | 1 |

SINGLE INSTRUCTION DECODE CIRCUIT FOR DECODING INSTRUCTION FROM MEMORY AND INSTRUCTIONS FROM AN INSTRUCTION GENERATION CIRCUIT

CROSS-REFERENCE TO RELATED APPLICATION

This application claims the benefit of priority to Japanese Patent Application No. 2007-143517, filed May 30, 2007, of which full contents are incorporated herein by reference.

BACKGROUND OF THE INVENTION

1. Field of the Invention

The present invention relates to a processor.

2. Description of the Related Art

When an interruption occurs or when a mode is switched to a sleep mode to reduce power consumption, a processor saves data stored in all registers or some registers used for a process in execution on the stack. When data stored in a plurality of registers are saved in this way, stack instructions are read from a program memory in accordance with the number of target registers to execute stack processes (e.g., Japanese Patent Application Laid-Open Publication No. 2003-345456).

Since a program has the stack instructions written for saving data of a plurality of registers, a program size is increased in accordance with the number of the registers.

SUMMARY OF THE INVENTION

A processor according to an aspect of the present invention, includes: a plurality of registers; an instruction readout circuit configured to read out an instruction from a memory; an instruction generation circuit configured to generate instructions for saving data into a predetermined storage area, for the respective registers, if the instruction read out by the instruction readout circuit is an instruction causing the data stored in each of the plurality of registers to be saved; and an instruction execution circuit configured to execute the instruction read out from the memory and the instructions generated by the instruction generation circuit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
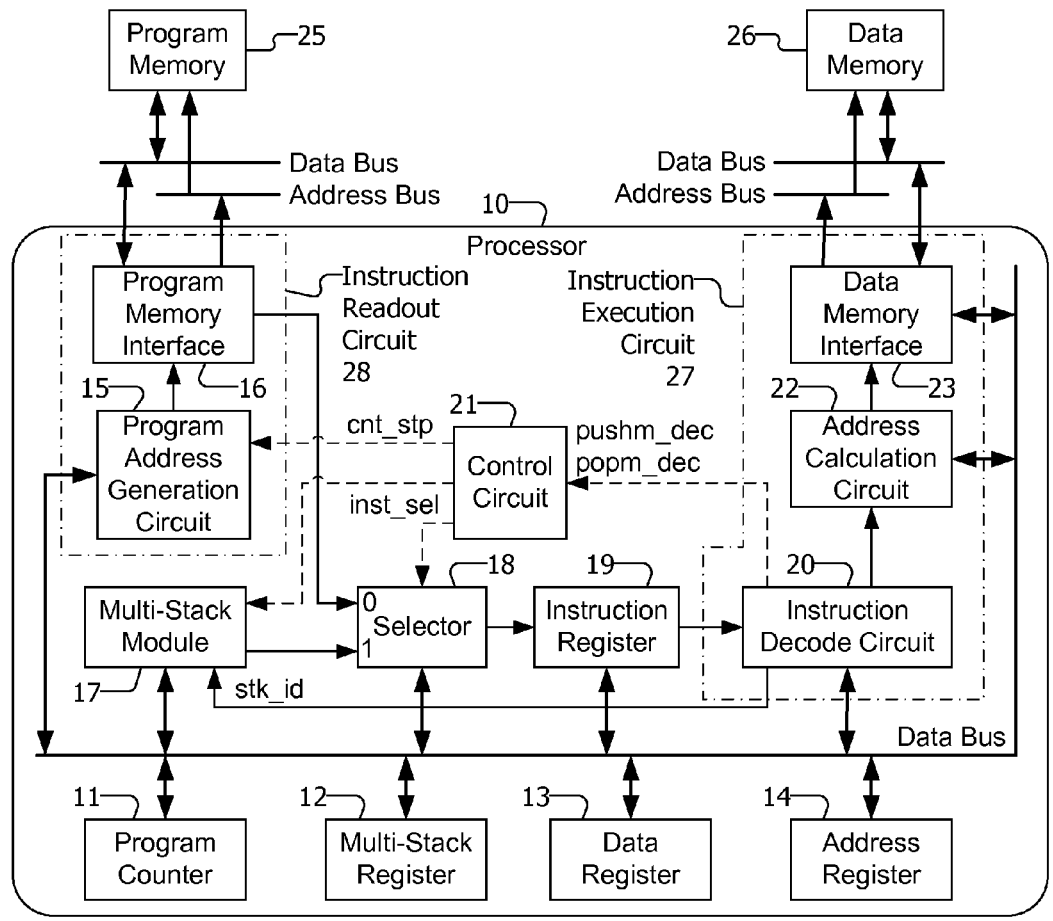
FIG. 1 depicts a configuration of a processor that is an embodiment of the present invention.

FIG. 1 depicts a configuration of a processor that is an embodiment of the present invention. A processor 10 includes a program counter 11, a multi-stack register 12, a data register 13, an address register 14, a program address generation circuit 15, a program memory interface 16, a multi-stack module 17, a selector 18, an instruction register 19, an instruction decode circuit 20, a control circuit 21, an address calculation circuit 22, and a data memory interface 23.

The program counter 11 has store thereon a program count value that specifies an instruction read from a program memory. The multi-stack register 12 (storage circuit) has store thereon data (specification data) specifying a plurality of registers to be stacked when a process is executed for stacking data stored in a plurality of registers (multi-stack process). The data register 13 has various data stored thereon and the address register 14 has various addresses stored thereon.

The program address generation circuit 15 counts up the program count value stored in the program counter 11 based on the control of the control circuit 21 and generates and outputs an address for a program memory 25 in accordance with the program count value. The program address generation circuit 15 can stop the update of the program count value in accordance with a signal cnt_stp output from the control circuit 21. In this embodiment, it is assumed that the update of the program count value is performed when the signal cnt_stp is "0" and stopped when the signal is "1".

The program memory interface 16 reads from the program memory 25 the instruction stored at the address generated by the program address generation circuit 15.

A circuit made up of the program address generation circuit 15 and the program memory interface 16 corresponds to an instruction readout circuit 28 of the present invention.

The multi-stack module 17 (instruction generation circuit) generates a plurality of PUSH instructions of saving on the stack the data stored in a plurality of registers specified data set in the multi-stack register 12 and generates a POP instruction for restoring the saved data in a plurality of specified registers based on the control of the control circuit 21.

The selector 18 selects and stores in the instruction register 19 either an instruction output from the program memory interface 16 or an instruction output from the multi-stack module 17 based on a selection signal inst_sel output from the control circuit 21. In this embodiment, it is assumed that the instruction output from the selector 18 is the instruction output from the program memory interface 16 when the selection signal inst_sel is "0" and is the instruction output from the multi-stack module 17 when the signal is "1".

The instruction decode circuit 20 decodes an instruction stored in the instruction register 19. If the decoded instruction is a PUSHM instruction that causes generation of a plurality of PUSH instructions, the instruction decode circuit 20 outputs to the control circuit 21 a signal pushm_dec indicating that the PUSHM instruction is decoded. Similarly, if the decoded instruction is a POPM instruction that causes generation of a plurality of POP instructions, the instruction decode circuit 20 outputs to the control circuit 21 a signal popm_dec indicating that the POPM instruction is decoded. The instruction decode circuit 20 outputs to the multi-stack module 17 the data stk_id indicating a stack pointer specified by the PUSHM instruction or the POPM instruction.

When receiving the signals pushm_dec or popm_dec from the instruction decode circuit 20, the control circuit 21 instructs the multi-stack module 17 to generate the PUSH instructions or the POP instructions and changes the signal cnt_stp to drive the program address generation circuit 15 to stop the update of the program count value. The control circuit 21 also changes the selection signal inst_sel to select the instructions output from the multi-stack module 17 during the generation of the PUSH instructions or the POP instructions by the multi-stack module 17.

The address calculation circuit 22 performs address calculations, etc., of access target data based on the decode result of the instruction decode circuit 20.

The data memory interface 23 accesses a data memory 26 based on the address calculated by the address calculation circuit 22. For example, the data memory interface 23 writes the data stored in the data register 13 into the data memory 26 or writes the data read from the data memory 26 into the data register 13. In the case of the PUSH instruction, the data stored in one specified register of the data register 13 and the address register 14 are saved onto a specified area within the data memory 26. In the case of the POP instruction, the data stored on a specified area within the data memory 26 are restored in one specified register of the data register 13 and the address register 14.

A circuit made up of the instruction decode circuit 20, the address calculation circuit 22, and the data memory interface 23 corresponds to an instruction execution circuit 27 of the present invention.

Figure 2:
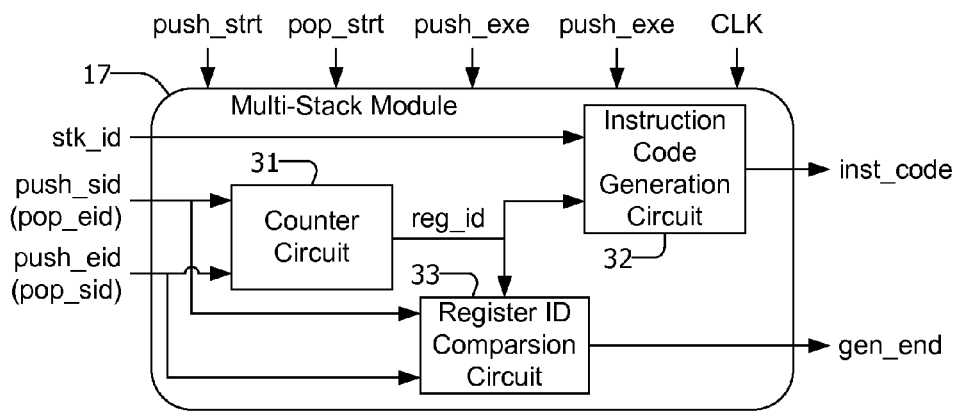
FIG. 2 depicts an exemplary configuration of a multi-stack module.

FIG. 2 depicts an exemplary configuration of the multi-stack module 17. The multi-stack module 17 includes a counter circuit 31, an instruction code generation circuit 32, and a register ID comparison circuit 33. The multi-stack module 17 receives inputs of a signal push_strt causing the generation of the PUSH instruction to be started, a signal push_exe causing the generation of the PUSH instruction to be generated, a signal pop_start causing the generation of the POP instruction to be started, a signal pop_exe causing the generation of the POP instruction to be executed, a clock CLK of the processor 10, data stk_id indicating a stack pointer, data push_sid indicating the start of the range of the registers that are the targets of the PUSH instructions, and data push_eid indicating the end thereof. In the case of the POP instructions, the multi-stack module 17 receives inputs of data pop_sid indicating the start of the range of the registers that are the targets of the POP instructions and data pop_eid indicating the end thereof. The multi-stack module 17 outputs generated instruction codes inst_code and a signal gen_end indicating the end of the generation of the instructions. In this embodiment, it is assumed that the signals push_strt, push_exe, pop_strt, and pop_exe causing the start of the respective operations in the case of "1".

The counter circuit 31 counts up or down and outputs data reg_id for identifying a register that is an argument of the generated PUSH instruction or POP instruction in accordance with the clock CLK based on the data push_sid (pop_eid) and push_eid (pop_sid) indicating the range of the registers to be stacked.

The instruction code generation circuit 32 uses the data reg_id output from the counter circuit 31 and the data stk_id output from the instruction decode circuit 20 to output an instruction inst_code, which is the PUSH instruction for saving the data stored in the register specified by the data reg_id into a stack area (storage area) pointed by the stack pointer indicated by the data stk_id or the POP instruction for restoring the data stored in the stack area pointed by the stack pointer indicated by the data stk_id into the register specified by the data reg_id.

The register ID comparison circuit 33 compares the data reg_id output from the counter circuit 31 with the data push_sid (pop_eid) and push_eid (pop_sid) indicating the range of the registers to be stacked and outputs the signal gen_end indicating the end of the generation of the PUSH instructions or the POP instructions.

Figures 3, 4:
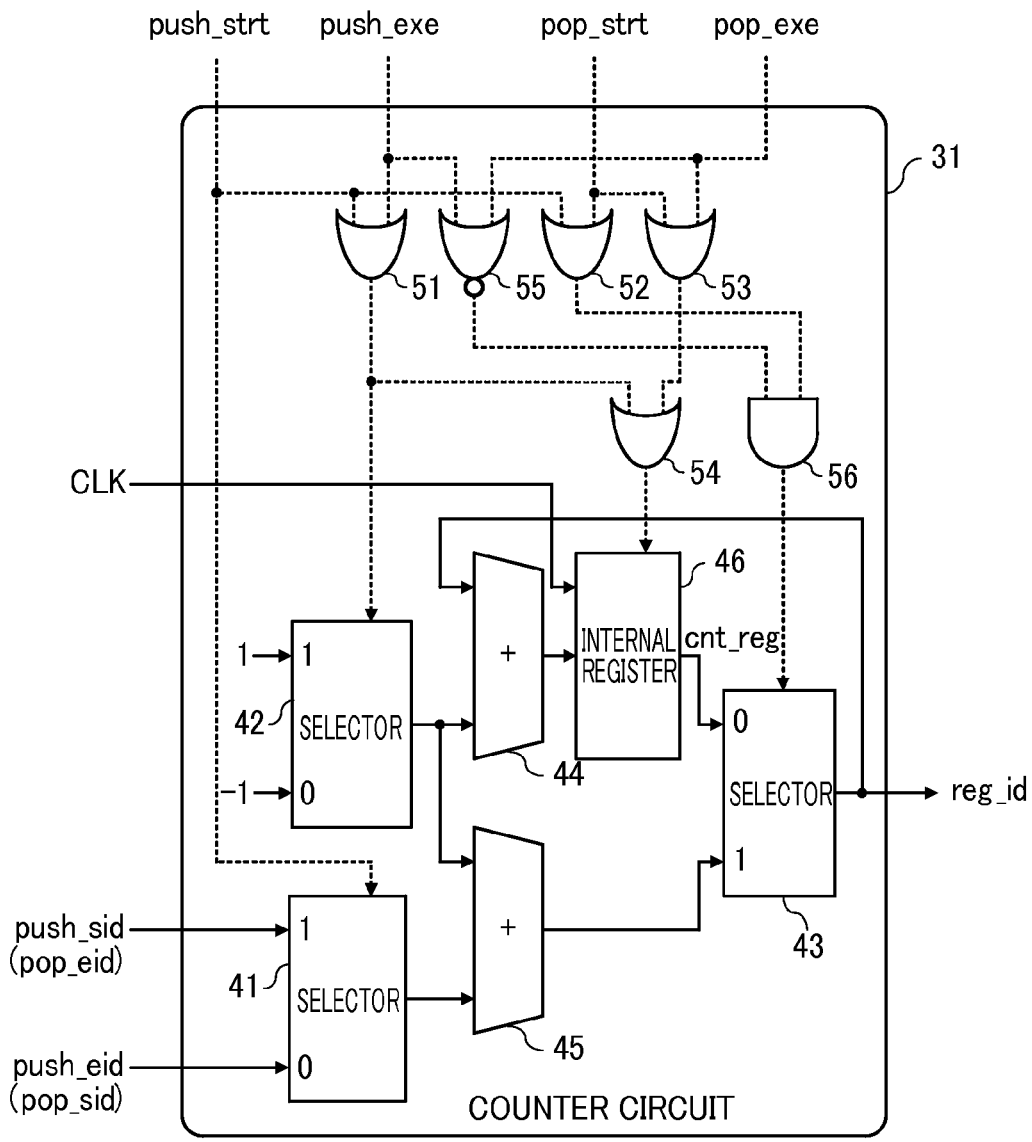
FIG. 3 depicts an exemplary configuration of a counter circuit.
FIG. 4 depicts the operation of the counter circuit.

FIG. 3 depicts an exemplary configuration of the counter circuit 31. The counter circuit 31 includes selectors 41 to 43, adders 44, 45, an internal register 46, OR circuits 51 to 54, and an AND circuit 56.

FIG. 4 depicts the operation of the counter circuit 31. For example, when the signal push_strt causing the start of the generation of the PUSH instructions becomes "1", the selector 41 outputs the data push_sid and the selector 42 outputs "1". Therefore, the data reg_id output from the selector 43 becomes push_sid+1, and data cnt_reg output from the internal register 46 becomes push_sid+2. When the signal push_exe causing the execution of the generation of the PUSH instructions becomes "1", the data reg_id output from the selector 43 becomes the data cnt_reg output from the internal register 46, and the data cnt_reg is counted up by one in accordance with the clock CLK. That is, if the PUSH instructions are generated, the data reg_id is sequentially counted up from push_sid+1. Similarly, if the POP instructions are generated, the data reg_id is sequentially counted down from pop_sid−1.

Figures 5, 6:
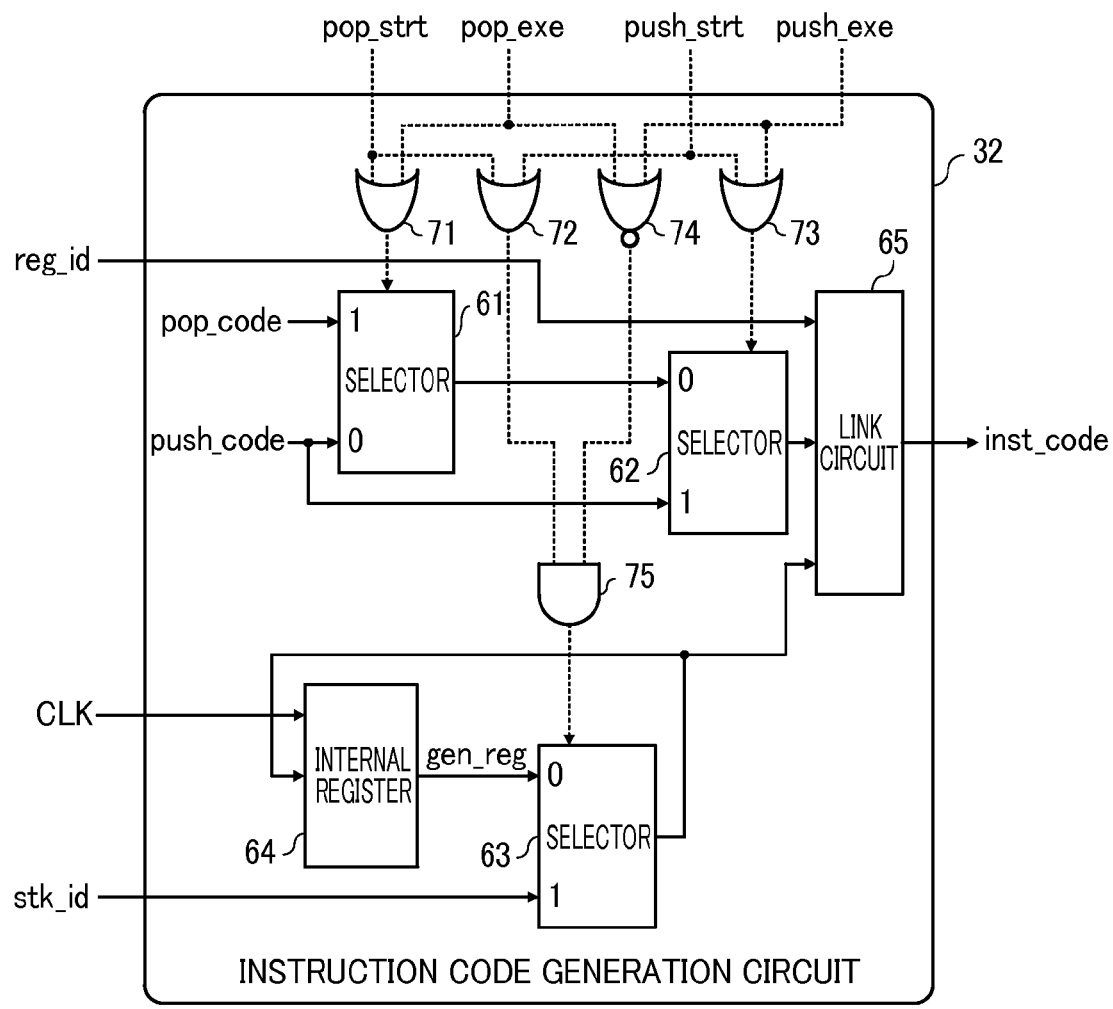
FIG. 5 depicts an exemplary configuration of an instruction code generation circuit.
FIG. 6 depicts the operation of the instruction code generation circuit.

FIG. 5 depicts an exemplary configuration of the instruction code generation circuit 32. The instruction code generation circuit 32 includes selectors 61 to 63, an internal register 64, a link circuit 65, OR circuits 71 to 73, a NOR circuit 74, and an AND circuit 75. Push_code is an instruction code of the PUSH instruction and, pop_code is an instruction code of the POP instruction. The link circuit 65 links data output from the selector 63 and the input data reg_id with the instruction code output from the selector 62 to output an instruction inst_code.

FIG. 6 depicts the operation of the instruction code generation circuit 32. For example, if the signal push_strt causing the start of the generation of the PUSH instructions is "1", the selector 62 outputs the instruction code push_code, and the selector 63 outputs the data stk_id. Therefore, the instruction inst_code output from the link circuit 65 is an instruction push+reg_id+stk_id for the PUSH of the register indicated by the data reg_id to an area pointed by the stack pointer indicated by the data stk_id. The internal register 64 retains the data stk_id output from the selector 63, and when the signal push_exe causing the execution of the generation of the PUSH instructions becomes "1", the data output from the selector 63 become the data gen_reg output from the internal register 64, and the instruction output from the link circuit 65 is an instruction push+reg_id+gen_reg. That is, if the PUSH instruction is generated, an instruction is output for saving the register indicated by the data reg_id into the area pointed by the stack pointer indicated by the data stk_id. Similarly, if the POP instruction is generated, an instruction is output for restoring the data stored in the area pointed by the stack pointer indicated by the data stk_id into the register indicated by the data reg_id.

Figures 7, 8:
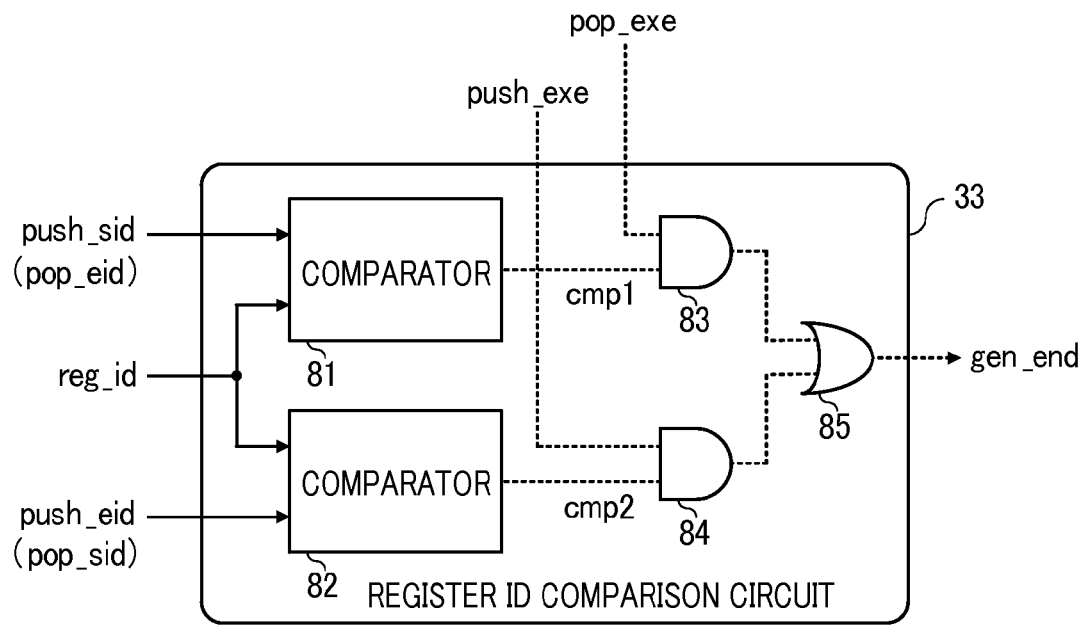
FIG. 7 depicts an exemplary configuration of a register ID comparison circuit.
FIG. 8 depicts the operation of the register ID comparison circuit.

FIG. 7 depicts an exemplary configuration of the register ID comparison circuit 33. The register ID comparison circuit 33 includes comparators 81, 82, AND circuits 83, 84, and an OR circuit 85. Signals cmp1, cmp2 output from the comparators 81, 82 become "0" if two input data are different and "1" if the data are equal.

FIG. 8 depicts the operation of the register ID comparison circuit 33. For example, the PUSH instructions are generated, when the data reg_id is counted up and becomes equal to the data push_eid, the signal cmp2 becomes "1", and the signal gen_end indicating the end of the generation becomes "1". Similarly, if the POP instructions are generated, when the data reg_id is counted down and becomes equal to the data pop_eid, the signal cmp1 becomes "1", and the signal gen_end indicating the end of the generation becomes "1".

Figure 9:
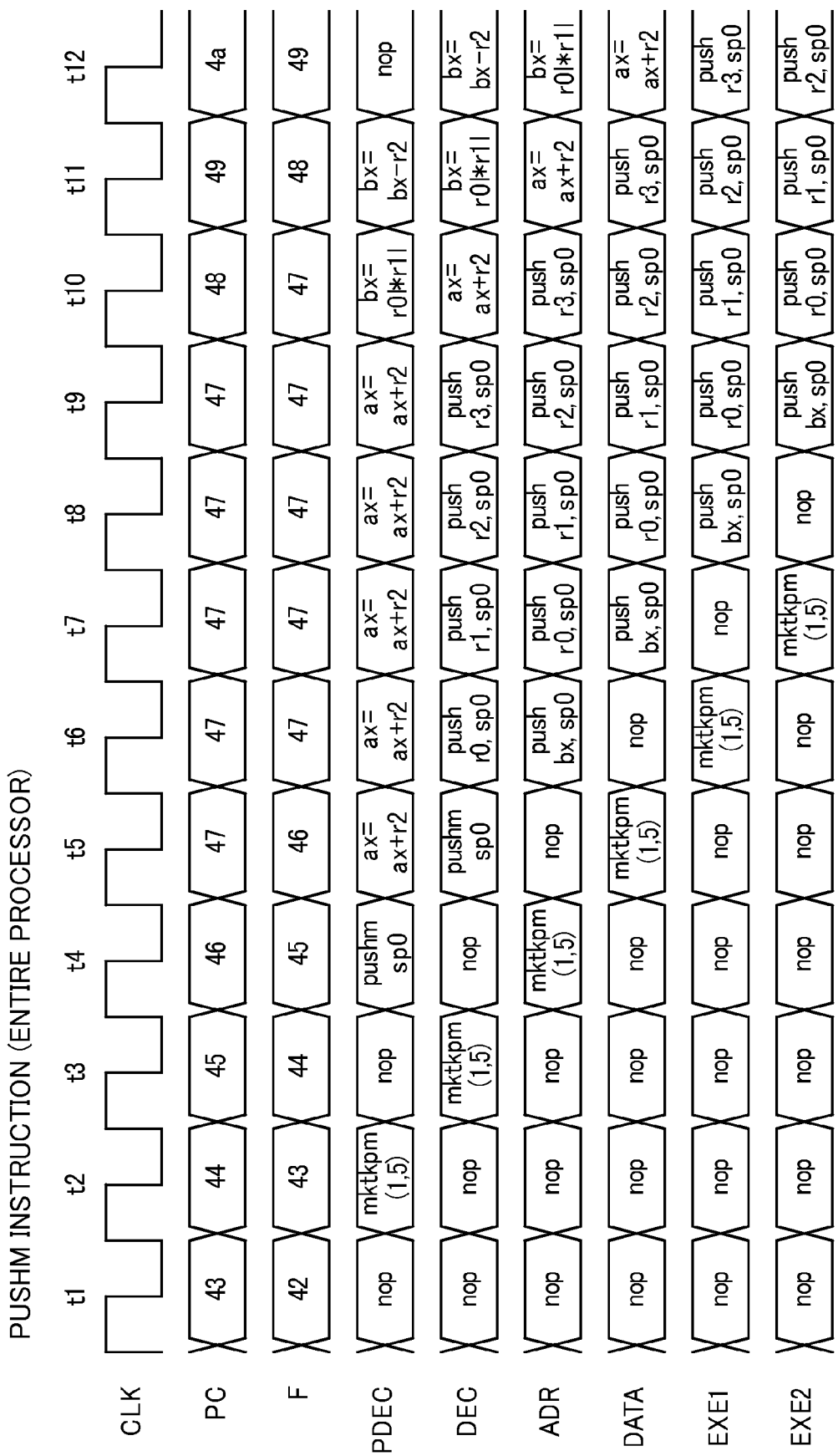
FIG. 9 depicts a timing chart of the entire processor in the case of the PUSHM instruction.
Figure 10:
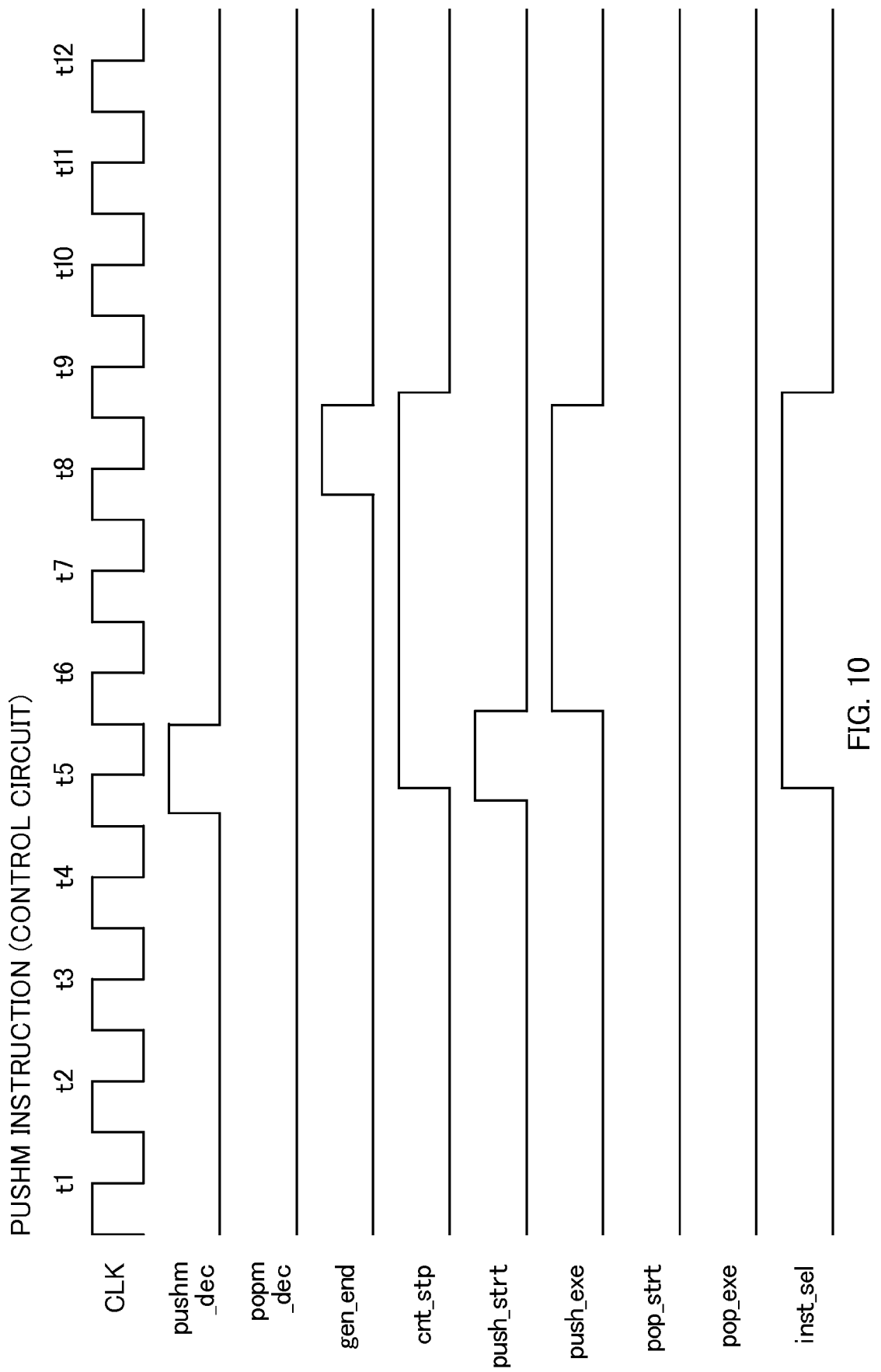
FIG. 10 depicts a timing chart of a control circuit in the case of the PUSHM instruction.
Figure 11:
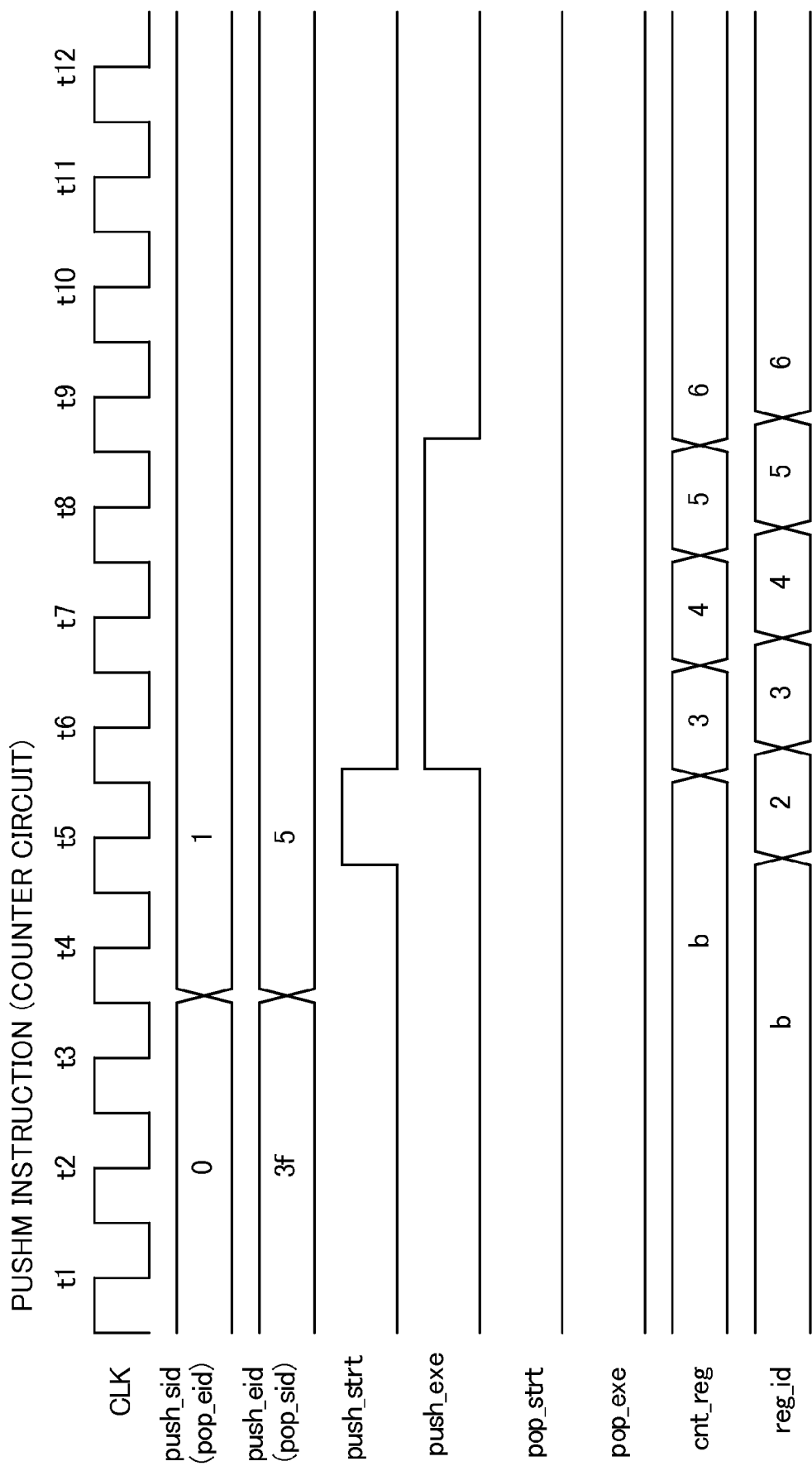
FIG. 11 depicts a timing chart of the counter circuit in the case of the PUSHM instruction.
Figure 12:
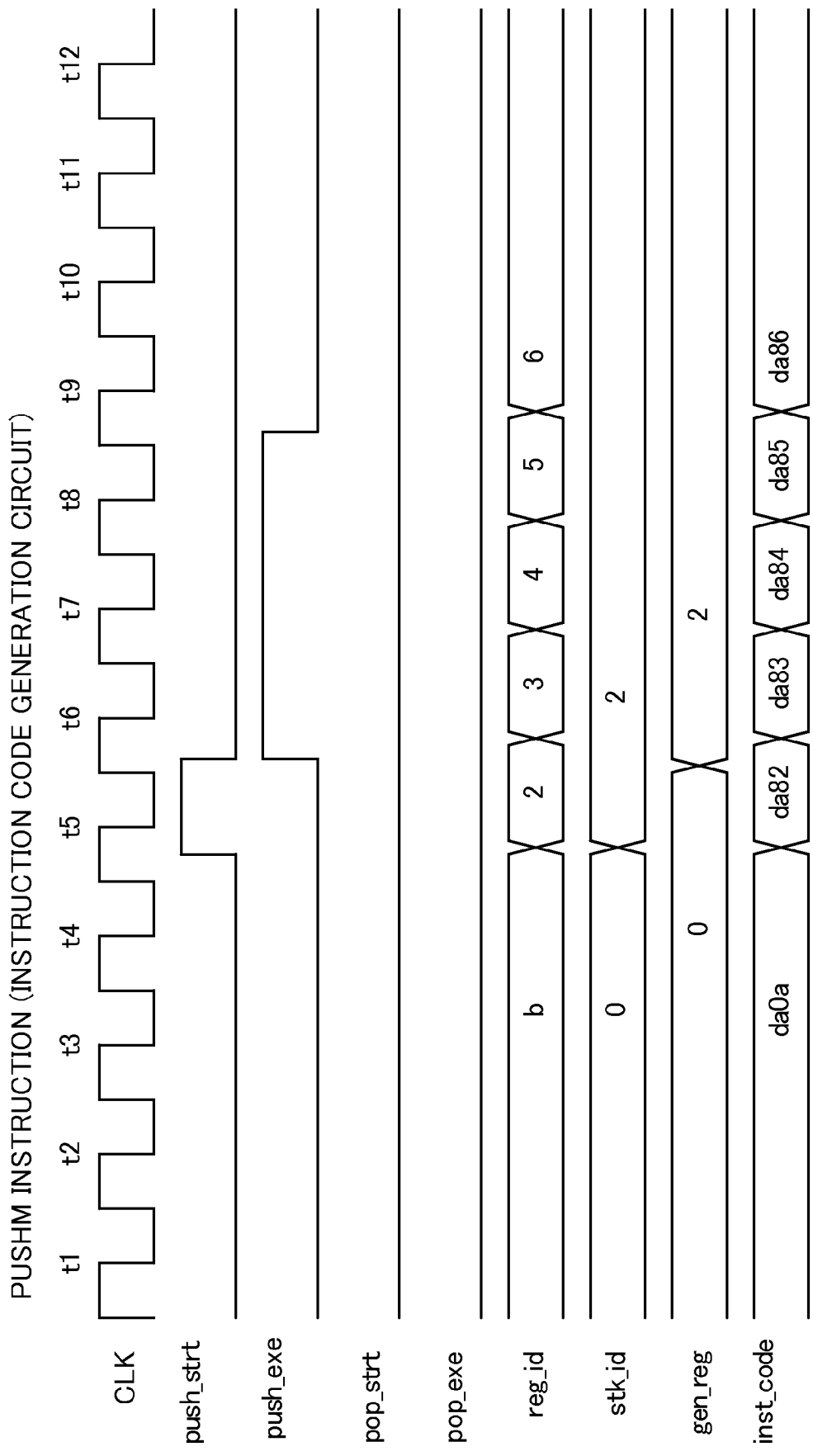
FIG. 12 depicts a timing chart of the instruction code generation circuit in the case of the PUSHM instruction.
Figure 13:
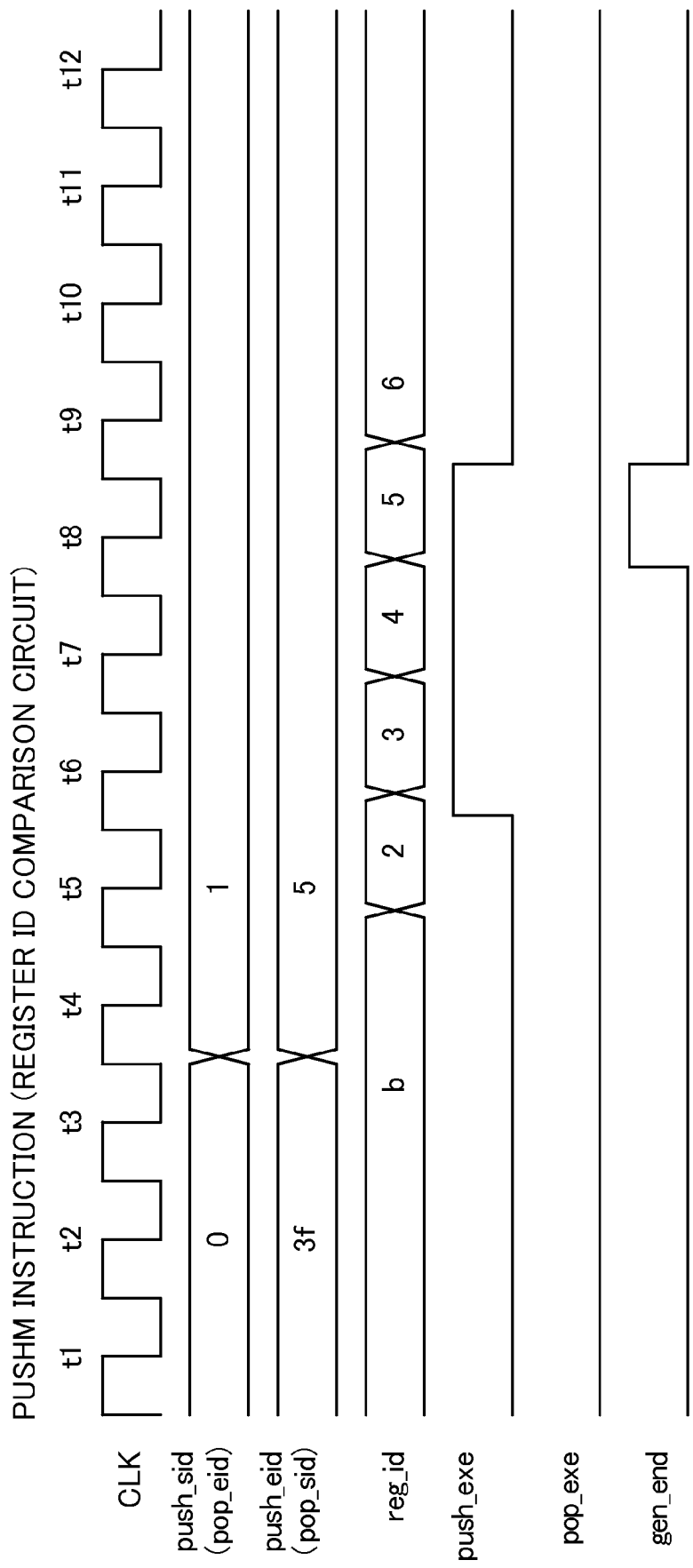
FIG. 13 depicts a timing chart of the register ID comparison circuit in the case of the PUSHM instruction.

FIGS. 9 to 13 are timing charts of an example of the multi-stack process in accordance with the PUSHM instruction. Specifically, FIG. 9 depicts a timing chart of the entire processor 10; FIG. 10 depicts a timing chart of the control circuit 21; FIG. 11 depicts a timing chart of the counter circuit 31; FIG. 12 depicts a timing chart of the instruction code generation circuit 32; and FIG. 13 depicts a timing chart of the register ID comparison circuit 33. It is assumed that PC denotes a program counter value and that F, PDEC, DEC, ADR, DATA, EXE1, and EXE2 denote phases of program fetch, pre-decode, decode, address calculation, data memory access, calculation 1, and calculation 2 in pipeline processing, respectively.

In the initial state, as shown in FIG. 10, the signal cnt_stp is "0". Therefore, as shown in FIG. 9, the program count value PC of the program counter 11 is counted up in accordance with the clock CLK. As shown in FIG. 10, the selection signal inst_sel is "0". Therefore, as shown in FIG. 9, an instruction is fetched from the program memory 25 in accordance with the program count value PC. As shown in FIG. 9, the MST-KPM instruction is executed to specify the registers to be stacked before the PUSHM instruction.

The MSTKPM instruction of the present invention is described as mstkpm (a, b) in the program; the data denoted by a is set as push_sid (pop_eid); and the data denoted by b is set as push_eid (pop_sid). In the example of FIG. 9, "1" is set as push_sid and "5" is set as push_eid. It is assumed that the relationship between the registers and the push_sid (pop_eid) and push_eid (pop_sid) is preliminarily defined.

When the PUSHM instruction is subsequently fetched and decoded, the instruction decode circuit 20 changes the signal pushm_dec to "1" as shown in FIG. 10. The control circuit 21 correspondingly changes the signal push_strt to "1", the signal cnt_stp to "1", and the selection signal inst_sel to "1". As shown in FIG. 9, this leads to the end of the update of the program counter value PC and causes the multi-stack module 17 to start the generation of the PUSH instructions, and the selector 18 outputs the instructions output from the multi-stack module 17.

The PUSHM instruction of the embodiment is described as pushm stk_id in the program. The instruction decode circuit 20 decodes the instruction of pushm stk_id as the PUSH instruction for saving the data stored in the register indicated by push_sid into the area pointed by the stack pointer indicated by stk_id. Therefore, in FIG. 9, after the address calculation phase, the instruction of pushm sp0 becomes push bx, sp0 that is the PUSH instruction for saving the data stored in the register indicated by bx into the area pointed by the stack pointer indicated by sp0. The bx indicates a register corresponding to the push_sid having "1".

When the signal push_strt output from the control circuit 21 becomes "1" and the signal push_exe then becomes "1", the data reg_id output from the counter circuit 31 is sequentially counted up from "2", which is obtained by adding one to "1" representing push_sid, as shown in FIG. 11. As shown in FIG. 12, the instruction code generation circuit 32 sequentially generates and outputs the instructions inst_code for saving data of r0 to r3 that are registers corresponding to reg_id having "2" to "5" into the area pointed by the stack pointer indicated by sp0.

When the data reg_id output from the counter circuit 31 becomes "5" equivalent to push_eid, the signal gen_end output from the register ID comparison circuit 33 becomes "1" as shown in FIG. 13. As shown in FIG. 10, the control circuit 21 correspondingly changes the signal push_exe to "0", the signal cnt_stp to "0", and the selection signal inst_sel to "0". As shown in FIG. 9, this causes the multi-stack module 17 to end the generation of the PUSH instructions; the update of the program counter value PC is resumed; and the selector 18 outputs the instruction output from the program memory interface 16.

Figure 14:
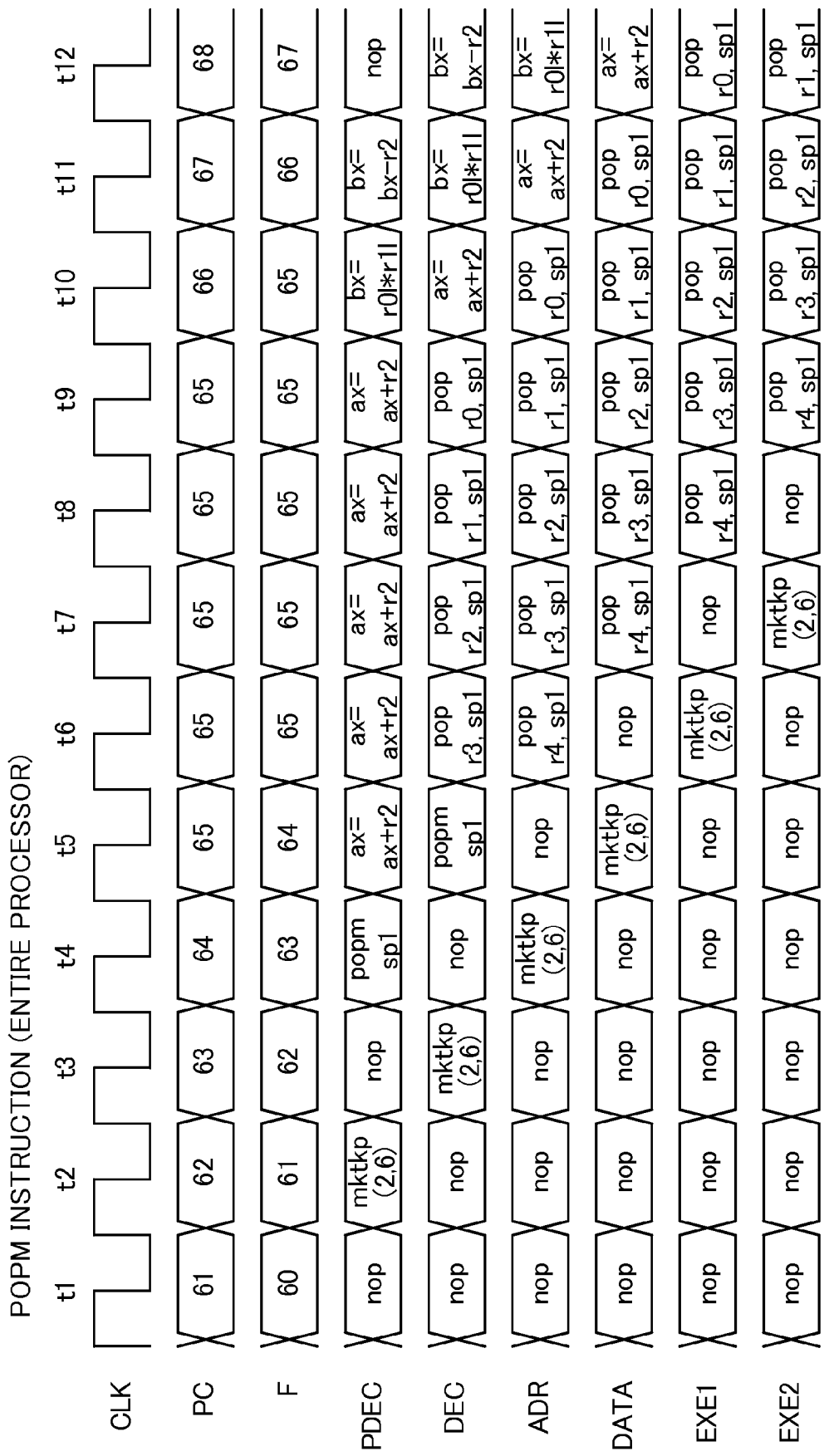
FIG. 14 depicts a timing chart of the entire processor in the case of the POPM instruction.
Figure 15:
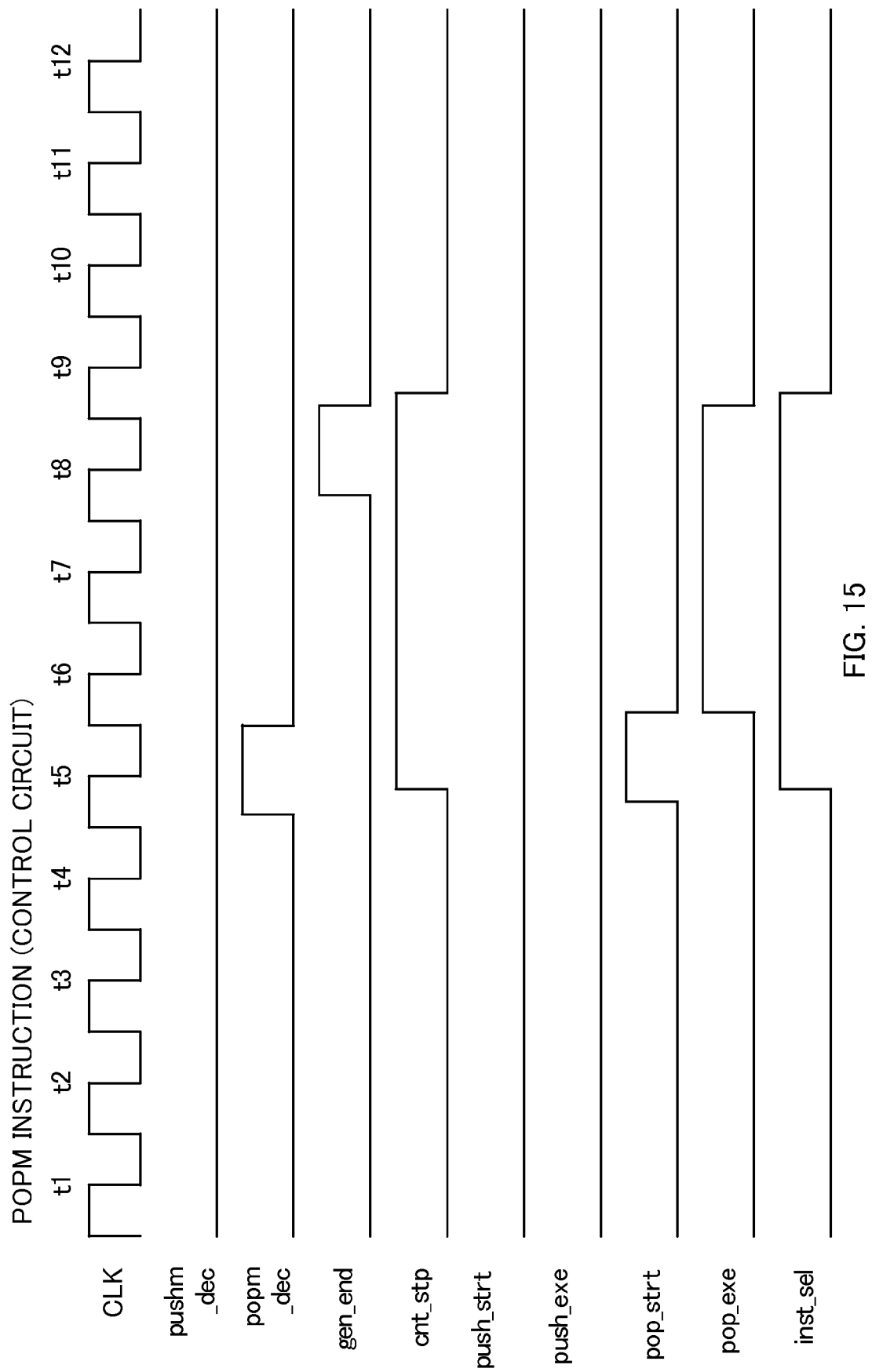
FIG. 15 depicts a timing chart of the control circuit in the case of the POPM instruction.
Figure 16:
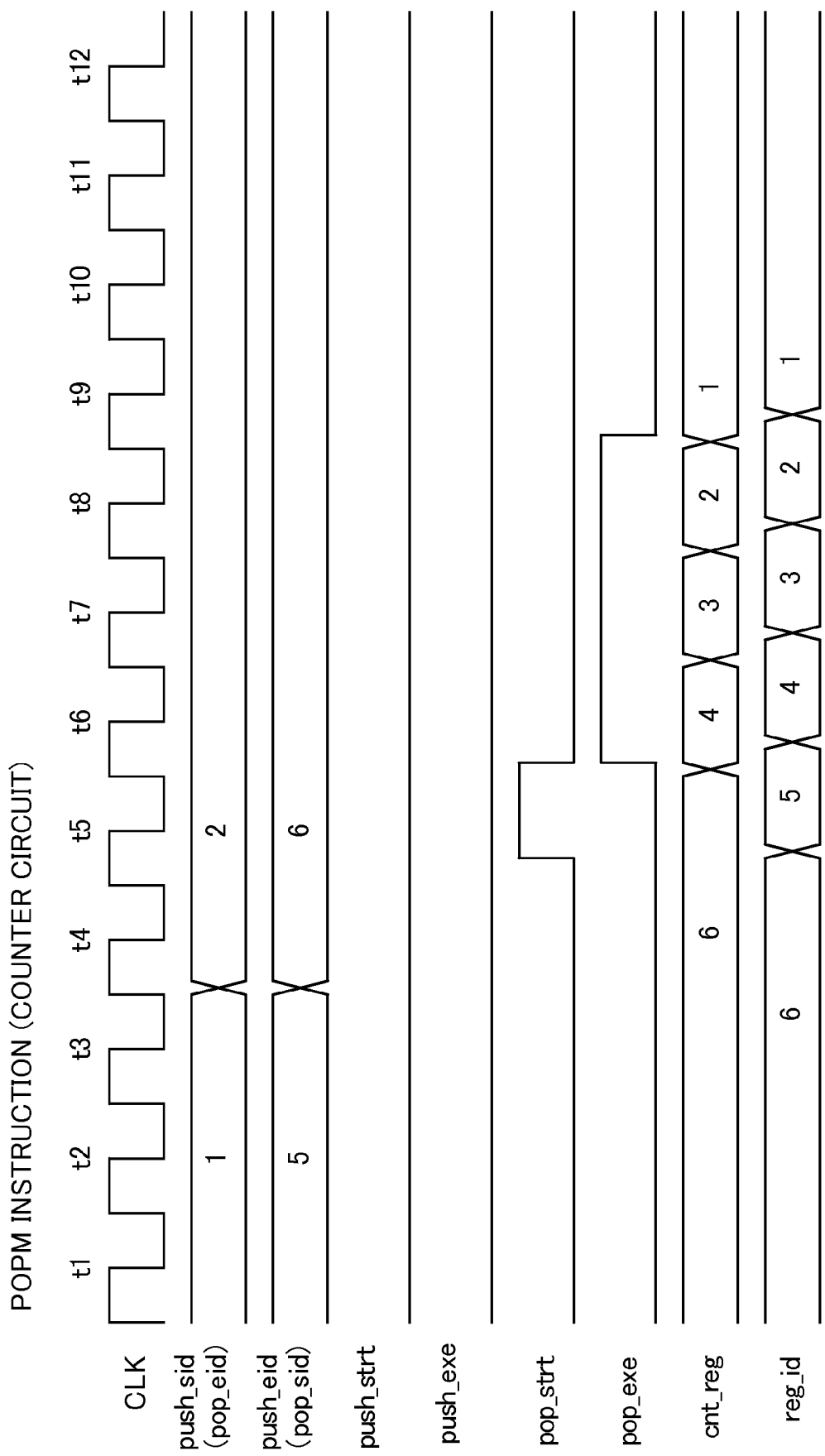
FIG. 16 depicts a timing chart of the counter circuit in the case of the POPM instruction.
Figure 17:
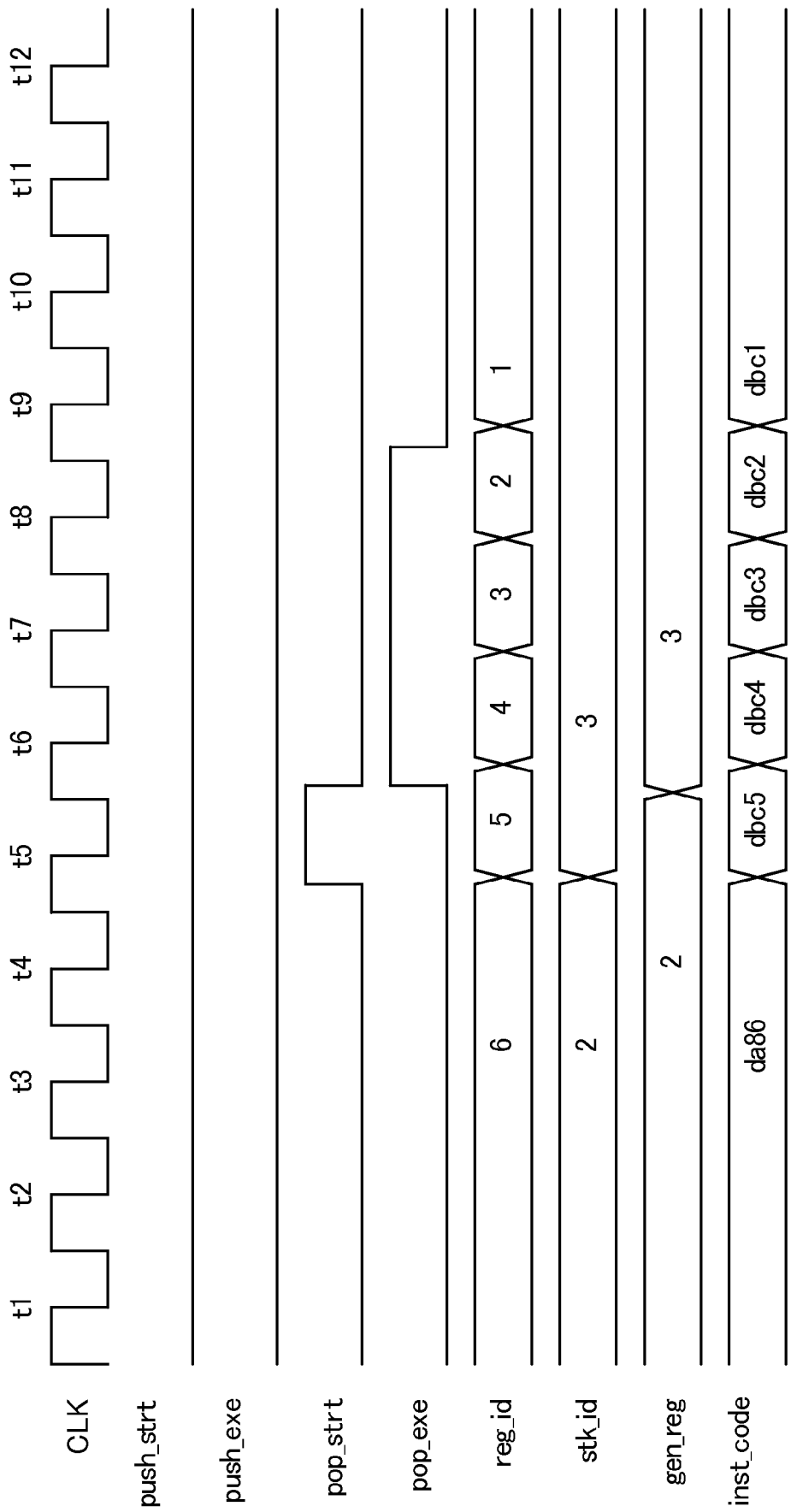
FIG. 17 depicts a timing chart of the instruction code generation circuit in the case of the POPM instruction.
Figure 18:
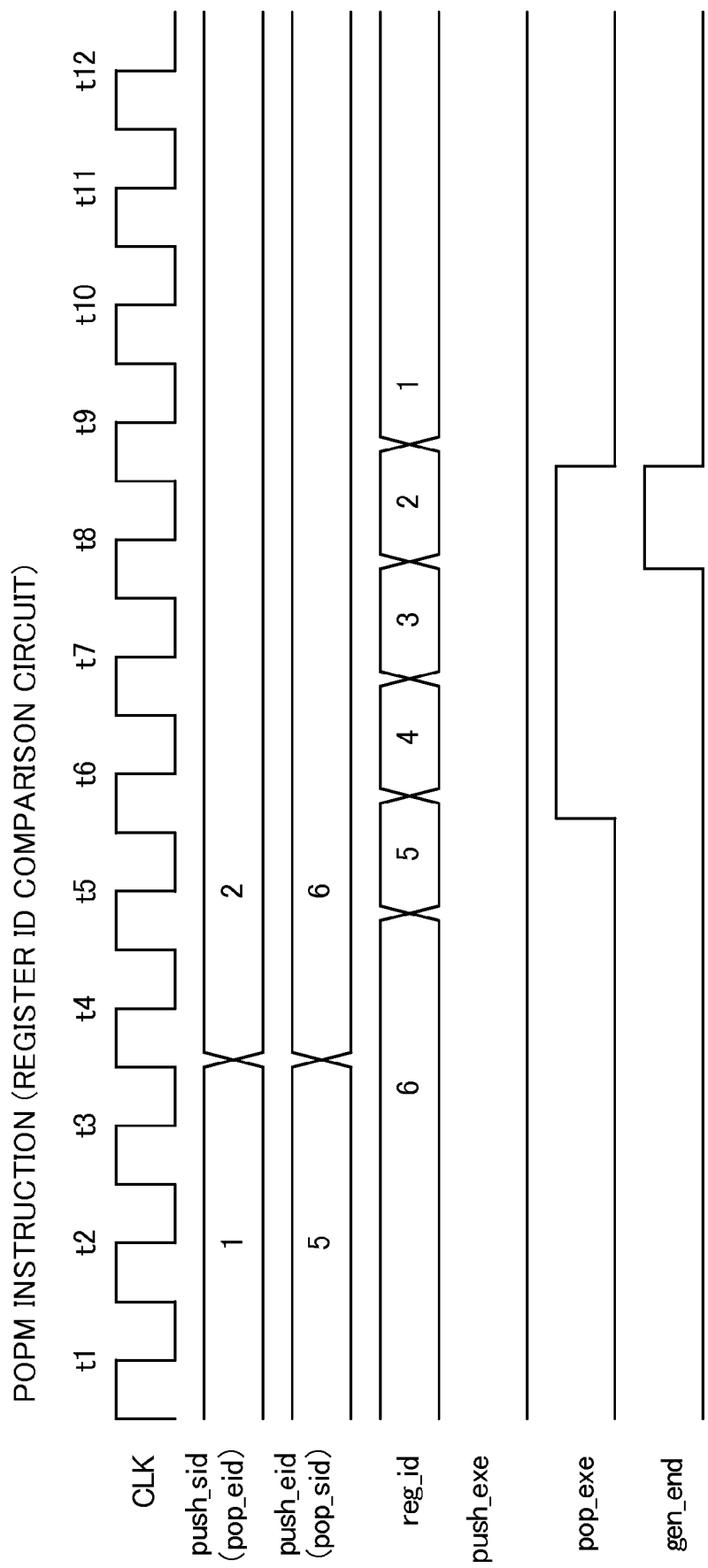
FIG. 18 depicts a timing chart of the register ID comparison circuit in the case of the POPM instruction.

FIGS. 14 to 18 are timing charts of an example of the multi-stack process in accordance with the POPM instruction. Specifically, FIG. 14 depicts a timing chart of the entire processor 10; FIG. 15 depicts a timing chart of the control circuit 21; FIG. 16 depicts a timing chart of the counter circuit 31; FIG. 17 depicts a timing chart of the instruction code generation circuit 32; and FIG. 18 depicts a timing chart of the register ID comparison circuit 33.

In the case of the POPM instruction, basic operations are the same as the case of PUSHM shown in FIGS. 9 to 13 although the signal pushm_dec is the signal popm_dec and the signals push_strt and push_exe are the signals pop_strt and pop_exe.

As above, since the processor 10 uses the PUSHM instruction to generate all of the plurality of PUSH instructions for a plurality of registers with the multi-stack module 17 instead of fetching the instructions from the program memory 25, a size of the program stored on the program memory 25 can be reduced.

Since the processor 10 uses the POPM instruction to generate all of the plurality of POP instructions for a plurality of registers with the multi-stack module 17 instead of fetching the instructions from the program memory 25, a size of the program stored on the program memory 25 can be reduced.

Since the processor 10 stops fetching instructions from the program memory 25 when generating the PUSH instructions or the POP instructions with the multi-stack module 17, power consumption due to accessing to the program memory 25 can be reduced.

The processor 10 determines the registers to be stacked based on the data set in the multi-stack register 12. Therefore, only the registers needed to be saved or restored can be stacked, which enables an improvement in process efficiency and reduction of power consumption.

Since the processor 10 implements in the multi-stack register 12 the instruction for setting data indicating a range of registers to be stacked, the registers to be stacked can appropriately be changed in accordance with the process status, which enables an improvement in process efficiency and reduction of power consumption.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A processor comprising:
   a plurality of registers;
   an instruction readout circuit configured to read out an instruction from a memory;
   an instruction decode circuit configured to decode the instruction read out from the memory by the instruction readout circuit;
   an instruction generation circuit configured to generate instructions, each for saving data of a respective one of the plurality of registers into a predetermined storage area, if the instruction read out from the memory by the instruction readout circuit and decoded by the instruction decode circuit is an instruction causing the data stored in each of the plurality of registers to be saved;
   an address calculation circuit; and
   a data memory interface;
   the instruction decode circuit being further configured to decode the instructions generated by the instruction generation circuit;
   the address calculation circuit being configured to calculate an address within the predetermined storage area based on a decode result of the instruction decode circuit;
   the data memory interface being configured to access the predetermined storage area based on the address calculated by the address calculation circuit.

2. The processor of claim 1, wherein
   the instruction generation circuit is further configured to generate instructions, each for restoring the data from the predetermined storage area into the respective one of the plurality of registers, if the instruction read out from the memory by the instruction readout circuit and decoded by the instruction decode circuit is an instruction causing the data saved in the predetermined storage area to be restored in each of the plurality of registers.

3. The processor of claim 2, further comprising
   a control circuit configured to instruct the instruction generation circuit to generate the instructions for the respective registers as well as the instruction readout circuit to stop reading out the instruction from the memory, if the instruction read out from the memory by the instruction readout circuit and decoded by the instruction decode circuit is an instruction causing the instruction generation circuit to generate the instructions for the respective registers.

4. The processor of claim 3, further comprising
   a storage circuit configured to store a specification data for specifying a portion of the plurality of registers, wherein
   the instruction generation circuit is further configured to generate the instructions for registers respectively, the registers being specified by the specification data stored in the storage circuit among the plurality of registers.

5. The processor of claim 2, further comprising
   a storage circuit configured to store a specification data for specifying a portion of the plurality of registers, wherein
   the instruction generation circuit is further configured to generate the instructions for registers respectively, the registers being specified by the specification data stored in the storage circuit among the plurality of registers.

6. The processor of claim 1, further comprising
   a control circuit configured to instruct the instruction generation circuit to generate the instructions for the respective registers as well as the instruction readout circuit to stop reading out the instruction from the memory, if the instruction read out from the memory by the instruction readout circuit and decoded by the instruction decode circuit is an instruction causing the instruction generation circuit to generate the instructions for the respective registers.

7. The processor of claim 6, further comprising
   a storage circuit configured to store a specification data for specifying a portion of the plurality of registers, wherein
   the instruction generation circuit is further configured to generate the instructions for registers respectively, the registers being specified by the specification data stored in the storage circuit among the plurality of registers.

8. The processor of claim 1, further comprising
   a storage circuit configured to store a specification data for specifying a portion of the plurality of registers, wherein
   the instruction generation circuit is further configured to generate the instructions for registers respectively, the registers being specified by the specification data stored in the storage circuit among the plurality of registers.

* * * * *